United States Patent
Denton

(10) Patent No.: US 8,222,475 B2
(45) Date of Patent: Jul. 17, 2012

(54) METHOD FOR TREATING RADIOACTIVE WASTE WATER

(75) Inventor: Mark Slater Denton, Knoxville, TN (US)

(73) Assignee: EnergySolutions Diversified Services, Inc., Columbia, SC (US)

( * ) Notice: Subject to any disclaimer, the term of this patent is extended or adjusted under 35 U.S.C. 154(b) by 391 days.

(21) Appl. No.: 12/371,201

(22) Filed: Feb. 13, 2009

(65) Prior Publication Data

US 2009/0152203 A1    Jun. 18, 2009

Related U.S. Application Data

(63) Continuation of application No. 11/303,065, filed on Dec. 14, 2005, now Pat. No. 7,563,939.

(51) Int. Cl.
*G21F 9/00* (2006.01)
(52) U.S. Cl. .......... 588/20; 502/439; 23/295 R
(58) Field of Classification Search ............. 23/295 R; 502/401, 439, 526; 588/20
See application file for complete search history.

(56) References Cited

U.S. PATENT DOCUMENTS

| | | | |
|---|---|---|---|
| 4,594,215 A | 6/1986 | Panson et al. | |
| 4,842,812 A | 6/1989 | Panson et al. | |
| 5,266,494 A | 11/1993 | Lahoda et al. | |
| 5,640,701 A | 6/1997 | Grant et al. | |
| 5,658,450 A | 8/1997 | Tamarikin | |
| 5,728,303 A | 3/1998 | Johnson | |
| 6,099,738 A | 8/2000 | Wechsler et al. | |
| 6,663,783 B2 | 12/2003 | Stephenson et al. | |
| 6,706,196 B2 | 3/2004 | Holland | |
| 6,790,429 B2 | 9/2004 | Ciampi | |
| 6,797,179 B2 | 9/2004 | Arnaud | |
| 6,949,184 B2 | 9/2005 | Ashton | |
| 7,118,665 B2 | 10/2006 | Kin et al. | |
| 7,462,287 B2 | 12/2008 | Berrak et al. | |
| 7,563,939 B2 * | 7/2009 | Denton | 588/20 |
| 2003/0121864 A1 | 7/2003 | Kin et al. | |
| 2004/0251213 A1 | 12/2004 | Bradley | |
| 2005/0045534 A1 | 3/2005 | Kin et al. | |
| 2005/0224338 A1 | 10/2005 | Kin et al. | |
| 2005/0247571 A1 | 11/2005 | Grigg | |

OTHER PUBLICATIONS

Information about Related Patents and Patent Applications, see the section of the accompanying Information Disclosure Statement Letter entitled "Related Patents and Patent Applications" for further information.

(Continued)

*Primary Examiner* — Edward Johnson
(74) *Attorney, Agent, or Firm* — Holland & Hart

(57) ABSTRACT

A method and apparatus for treating radioactive waste water containing contaminating ions, colloids and suspended solids having like (usually negative) charges preventing their precipitation. An electric current is passed through the waste water in an EC assembly to cause electro-coagulation of the contaminants and anodes of this assembly are made of a metal that dissolves to provide cations for neutralizing the negative charges and forming precipitates containing neutralized contaminants. Precipitates are then separated from waste water by an electro-magnetic or other filtering unit. The water pH and conductivity may be adjusted before the EC assembly and additives may be introduced into its effluent for enlargement of precipitate particles, improvement of filtration, improvement of dewaterability, and/or enhancement of magnetism.

20 Claims, 4 Drawing Sheets

OTHER PUBLICATIONS

Electromagnetic Filter, Areva, dated Oct. 27, 2005, Author Unknown, from http://www.us.framatome-anp.com/nuclearservices/electromagntic.htm.

The Top 20 Water Technologies, WME Environmental Business Media, dated Oct. 27, 2005, author unknown, from http://www.wme.com.au/categories/water/nov5_04.php.

Electrocoagulation: an Environment-Freiendly Method for Separation of the Fine Particles From Water, Abfrageergebnisse, dated Oct. 27, 2005, from http://www.bit.bit.or.at/irca/bbsshow8.php?refl=TO-BUT-08&vQuelle=EcoundCo&cc=.

1.4.1 Theory of Coagulation and1.4.2 Theory of Electrocoagulation, General Environmental Corporation, pp. 5 & 6 from Innovative Technology Report, Sep. 1998, Office of Research & Development, Cincinnati, OH.

Kochen, Robert L., Actinide Removal From Aqueous Solution With Activated Magnetite, Rockwell International, North American Space Operations, Golden, CO, Aug. 10, 1987 (18 pp.).

Tsouris, C., et al., Electrocoagulation for Magnetic Seeding of Colloidal Particles Chemical technology Division, Oak Ridge National Laboratory, Oak Ridge, TN, Physicochemical and Engineering Aspects 177 (2001) 223-233 (11 pp.).

Ying, T.Y., et al., High-gradient Magnetically Seeded Filtration, Chemical Engineering Science 55 (2000) 1101-1113 (13 pp.).

* cited by examiner

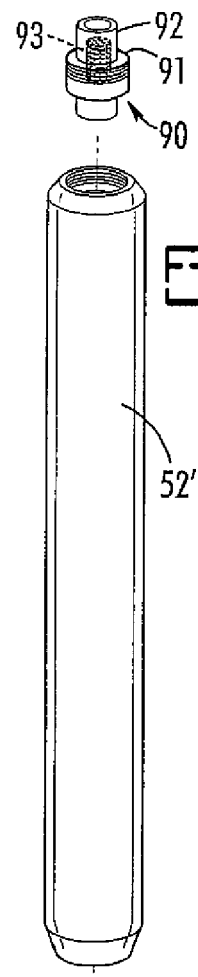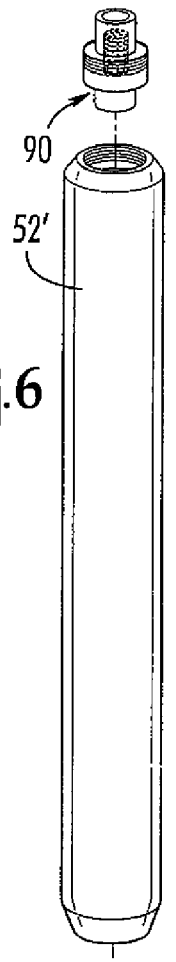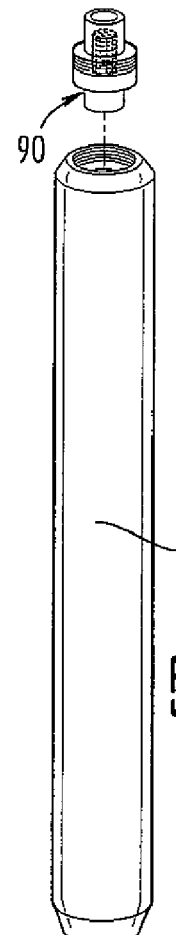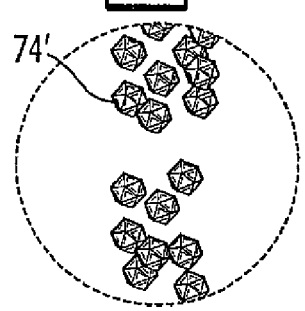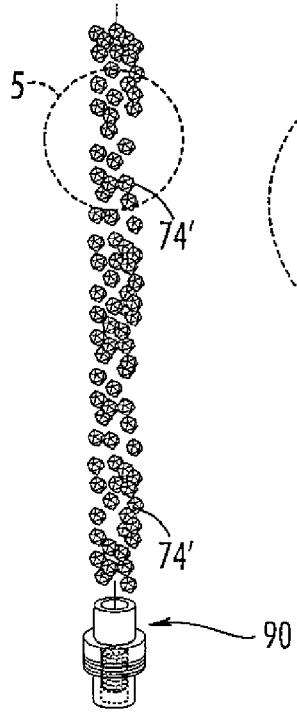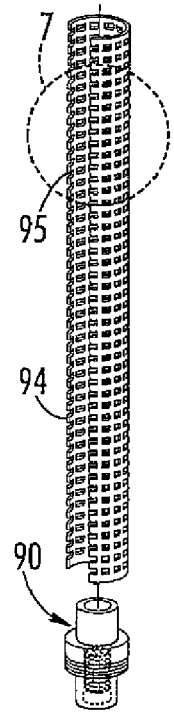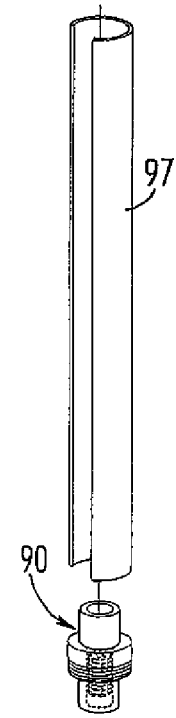

METHOD FOR TREATING RADIOACTIVE WASTE WATER

CROSS-REFERENCE TO RELATED PATENT APPLICATIONS

This patent application is a continuation of U.S. patent application Ser. No. 11/303,065, entitled "Method and System for Treating Radioactive Waste Water," filed on 14 Dec. 2005, and published as U.S. Patent Application Publication No. 2007/0131621, which is incorporated by reference herein in its entirety.

TECHNICAL FIELD

The method and apparatus of the invention relate to processing waste water from nuclear power reactors and other sources of water contaminated with radionuclides. In particular, the present method and apparatus are related to processing waste waters contaminated with colloidal, suspended and dissolved radionuclides.

BACKGROUND

In the commercial nuclear power industry, there are primarily two types of reactor systems, namely boiling water reactors (BWR) and pressurized water reactors (PWRs). Both use water to moderate the speed of neutrons released by the fissioning of fissionable nuclei, and to carry away heat generated by the fissioning process. Water flows through the reactor core, is recycled, and inevitably becomes contaminated with iron, Fe-55, colloidal and soluble cobalt, Co-58, and Co-60, and other radionuclides. The water further becomes contaminated with organics (e.g., oils and greases), biologicals and non-radioactive colloids (e.g., iron rust).

In a boiling water reactor (BWR), the water passing through the core will be used directly as steam in driving turbine-generators for the production of electricity. In a pressurized water reactor (PWR), the primary water that flows through the reactor is isolated from the secondary water that flows through the turbine generators by steam generators. In both cases, while the chemical constituents of the waste water will be different, these reactor systems will produce colloidal, suspended and dissolved solids that must be removed before the waste water may be reused or released to the environment.

The presence of iron (as iron oxide from carbon steel piping) in Boiling Water Reactor (BWR) circuits and waste waters is a decades old problem. The presence and buildup of this iron in condensate phase separators (CPS) further confounds the problem when the CPS tank is decanted back to the plant. Iron carryover here is unavoidable without further treatment steps. The form of iron in these tanks, which partially settles and may be pumped to a de-waterable high integrity container (HIC), is particularly difficult and time consuming to dewater. The addition of chemicals upstream from the CPS, such as flocculation polymers, to precipitate out the iron only produces an iron form even more difficult to filter and dewater. Such chemically pretreated material contains both sub-micron particles and floc particles of sizes up to 100 microns. It is believed that the sub-micron particles penetrate into filter media, thus plugging the pores and preventing successful filtration of the larger micron particles.

Like BWR iron waste waters, fuel pools, or basins, (especially during the decontamination phase) often contain colloids which make clarity and good visibility nearly impossible. Likewise, miscellaneous, often high conductivity, waste steams at various plants contain such colloids as iron, salts (sometimes via seawater intrusion), dirt/clay, surfactants, waxes, chelants, biologicals, oils and the like. Such waste streams are not ideally suited for standard dead-end cartridge filtration or cross-flow filtration via ultrafiltration media (UF) and/or reverse osmosis (RO), even if followed by demineralizers. Filter and bed plugging are almost assured.

There are a number of prior art techniques used for removal of colloidal, suspended and dissolved solids, and the requirement to remove such materials from waste waters is not unique to nuclear reactors. However, the nature of nuclear reactors raises special concerns about the use of additives for chemical treatments because of the desire to avoid making radioactive wastes also chemical wastes.

There are other concerns as well. The processed waste water must be quite free of radioactive contaminants if it is to be released to the environment. The radioactive material extracted from the waste water during processing must be stable or in a form that can be stabilized for disposal in a way that meets disposal site requirements, particularly with respect to preventing the leaching out of radioactive contaminates by liquid water. Finally, the volume of the waste must be minimized because of both the limited space available for disposal of radioactive waste and the high cost of its disposal.

Accordingly there is a need for better ways of processing radioactive waste water containing suspended solids and dissolved ions from nuclear power reactors and other sources.

SUMMARY

The key to solving the above dilemmas is 1) to break the colloid by neutralizing the outer radius repulsive charges of similar charged colloidal particles, and 2) to cause these neutralized particles to flocculate and form a type of flocculent (floc) that is more readily filterable, and thus de-waterable. In the present invention, these tasks are carried out with the innovative application of an electro-coagulation (EC) unit to electrolytically seed the waste feed stream with a metal of choice, and without prior addition of chemicals common to ferri-floccing or flocculation/coagulation polymer addition. Once the colloid has been broken and floccing has begun, removal of the resultant floc can be carried out by standard backwashable filters, cross-flow filters (e.g., UF), or, in simple cases, dead-end filters. Such applications include low level radioactive waste (LLW) from both PWRs and BWRs, fuel pools, storage basins, salt water collection tanks and the like.

For the removal of magnetic materials, such as some BWR suspended irons (e.g., boiler condensates and magnetite and hemagnetite), an electromagnetic filter (EMF) unit may be coupled with the EC unit. For the removal of non-magnetic materials, the EC treatment may be followed by treatment with a flocculating chemical, such as a flocculating polymer like Betz-1138 which is a polyacrylamide copolymer available from the Betz Corporation. For a waste stream containing magnetic materials and one or more non-magnetic species, e.g., cesium (Cs), a magnetic seeding step for coupling the non-magnetic species to a magnetic moiety, e.g., CHFC (Cobalt hexaferricyanate), to form a magnetic chemical complex may be followed by the EMF for the effective removal of this complex.

Thus, the invention provides a method, apparatus and system for removing contaminants from radioactive waste waters by using electro-coagulation in combination preferably with magnetic filtration and/or treatment with a flocculation agent. The electro-coagulation may also be used to enhance the subsequent removal of contaminants by dead end filtration, high gradient magnetic filtration (HGMF), ultrafiltration (UF), back flushable filters (BFF), and high integrity containers (HICs) that are dewaterable with sheet filters. The electro-coagulation takes place after adjustments of the pH and the conductivity of the waste water, if needed. Sacrificial metal electrodes, which may be iron but preferably are aluminum, are used in batch or continuous electrolytic processing of the waste water to seed it with positively charged metal ions that neutralize and agglomerate negatively charged ions, suspended particles and colloidal particles.

The electro-coagulation (EC) process of the invention works on an electricity-based technology that passes an electric current through radioactive waste waters. Thus, electro-coagulation utilizes electrical direct current (DC) to provide cations from the sacrificial metal electrode ions (e.g., Fe or Al) that agglomerate and thereby precipitate out undesirable contaminates, including dissolved metals and non-metals, e.g., antimony (Sb). The electrical DC current is preferably introduced into the aqueous feed stream via parallel plates constructed of the sacrificial metal of choice. This process avoids the use of undesirable chemical additions (e.g., ferric chloride).

Moreover, the anode and cathode will hydrolyze water molecules, liberating oxygen and hydrogen, respectively, as tiny bubbles, the latter combining with many of the dissolved ions in the water to form insoluble oxides. The oxygen and hydrogen also will cause small, light particles to float and flocculate (e.g., oils and greases) so that they can also be skimmed off or filtered out. Some of these lighter particles are biological particles such as bacteria that have been destroyed by electro-osmotic shock.

The use of electro-coagulation with radionuclides has several specific advantages in addition to the fact that it will cause the precipitation or flotation of radionuclide species in the waste water. One of these is the oxidation of some species to render them stable in water. The oxidized species are then not toxic hazards and are not likely to be leached into the ground water if buried. They will generally pass the EPA TCLP test, which will result in significant cost savings in disposal. The production of oxygen through hydrolysis also acts as a bactericide and fungicide to further remove wastes other than purely radioactive wastes.

In addition to radionuclides, the waste waters may be contaminated by one or more of heavy metals, colloids, clay, dirt, surfactants, cleaners, oils, greases, biologicals, and the like. As these contaminated waste waters are passed through one or more EC cells, the following four treatment reactions occur:

1. Coagulation—Ions, colloids and suspended solids will remain suspended indefinitely in solution due to their like charges, which are usually negative. Thus, they repel each other and do not allow coagulation or floccing. As contaminated water passes through the cell assembly, DC power is applied continuously, or is pulsed, to the cell electrodes. Metallic ions from the positive cell electrodes (anodes) slough off and provide bridging seeds to the suspended solids and other contaminates present. Only as much electrode seed material is supplied as there are dissolved, colloidal and/or suspended solids present, thus controlling the solids addition. The metallic seed ions cause the charge of suspended or dissolved solids, colloids, oils and greases, and the like, to be neutralized. This charge neutralization causes the contaminants to coagulate, or floc, so that they become large enough to settle or float or be filtered by standard filtration media, ultra-filtration (UF), or reverse osmosis (RO), or, if magnetic, by electro-magnetic filtration (EMF) or High Gradient Magnetic Separation (HGMS) filtration. This coagulation process does not require the addition of chemicals with the exception of those for adjusting the pH or conductivity, if required.

2. Oxidation—As waste water contaminated by heavy and/or radioactive metals is passed through the EC cell(s), the metals are reduced to an oxide. The metal ions are thereby changed from a dissolved state to a suspended state and then are precipitated from the water. Heavy metals that are thus oxidized by passing through the electric current will generally pass a TCLP test, which provides significant savings in the cost of sludge disposal.

3. Aeration—A natural byproduct of this EC process is aeration. No air or any other gases need to be injected into the process, as the dissociation products of water form tiny bubbles giving the coagulated contaminants buoyancy. Thus, after treatment of the waste water, oils and greases therein can either be skimmed off, or re-mixed and settled or filtered with the rest of the coagulated sludge.

4. Biologicals—A further advantage of this EC Process is that it is a natural biocidal process because it ruptures microorganisms and the like by electro-osmotic shock.

The magnetic filter may comprise a ferromagnetic filtering medium that is temporarily magnetized when an electromagnetic field is passed through it via a surrounding coiled electrical conductor. The medium (or media) may comprise steel sheets, screens, beads or balls, the latter being preferred. Upon de-energizing the electro-magnetic field, this filtering medium, which is preferably made of soft magnetic material (e.g. 430 stainless steel), is no longer magnetized to allow the filter to be back-flushed for removal of the coagulated contaminates by flushing them off the filtering media. Thus, the core of the magnetic filter preferably is not made of a permanently magnetizable material but of a soft magnetic material that is electro-magnetizable and then can be demagnetized by simply removing the magnetizing electrical current from the surrounding coil so that the filtering media, preferably 400 series (e.g. 430 S.S.) stainless steel balls, can be backflushed for reuse. The agglomerated particles from the EC unit can also be removed from the waster water by conventional filtration techniques. Furthermore, many of the agglomerated particles may quickly settle out and these may be removed by simply decanting the clarified water. However, the use of an EMF for removal of radioactive precipitates is particularly advantageous because once removed, these waste solids may be easily backflushed to and handled by conventional radioactive waste (radwaste) disposal systems, thereby avoiding the radioactive filter waste generated by mechanical filtering equipment. As used in this specification and the appended claims, the term electromagnetic filtration (EMF) includes high gradient magnetic filtration and other magnetic filtration techniques that magnetically remove ferromagnetic particles or precipitates and that permit the filtered out material to be backflushed to a radwaste system.

Another particular feature of the present invention is that radionuclides which are not ferromagnetic, such as cesium-137, can be removed by the addition of a magnetic complexing agent, such as cobalt hexaferricyanate, which forms a magnetic complex with the radionuclides that can be removed by a magnetic filter.

Some of the advantages of the invention over conventional processes for chemical coagulation and mechanical filtration include the following:

(1) Less Waste Volume is created because there is no need for post ion exchange coupled with UF or the like.

(2) Provides consistent introduction of the seeding agent and only as needed, such as Fe or Al, at high throughputs.

(3) Provides improved water quality for those radioisotopes that cannot be taken out by UF or standard filtration.

(4) Provides operational advantages because there is no chemical introduction, no chloride introduction, and no significant pH swings.

(5) Less waste volume is created as compared to using chemical coagulants such as alum or lime, and to using flocculation polymers alone.

(6) The coagulant is significantly easier to dewater than chemical and purely polymer sludges because the electrocoagulated floe tends to contain less bound water, is more shear resistant, and is thus more readily filterable.

(7) The EC process is capable of acting as a biocide for the destruction of biological organisms because electron flooding of the waste water eliminates the polar effect of water complexes allowing colloidal materials to precipitate, and the increase of electrons creates an osmotic pressure that ruptures bacteria, cysts, and viruses.

(8) Metal oxides are formed that will pass TCLP disposal requirements.

(9) The EC process is not adversely effected by oils and greases and these contaminates are removed so that the output may be sent to deadend filtration, BFF, EMF, UF or RO.

(10) The EC process may be utilized without the introduction of chemicals, including polymers.

(11) The process equipment has an extremely small foot print.

(12) EC requires simple equipment and is easy to operate with sufficient operational latitude to handle most problems encountered on running.

(13) Wastewater treated by EC gives clear, colorless and odorless water.

(14) Sludge formed by EC tends to be readily settable and easy to de-water, because it is composed of mainly metallic oxides/hydroxides. Above all, it is a low sludge producing technique.

(15) Flocs formed by EC are similar to chemical floc, except that EC floc tends to be much larger, contains less bound water, is acid-resistant and more stable, and therefore, can be separated faster by filtration.

(16) EC produces effluent with less total dissolved solids (TDS) content as compared with chemical treatments. If this water is reused, the low TDS level contributes to a lower water recovery cost.

(17) The EC process has the advantage of removing the smallest colloidal particles, because the applied electric field readily neutralizes them, thereby facilitating the coagulation.

(18) The EC process avoids uses of chemicals and so there is no problem of neutralizing excess chemicals and no possibility of secondary pollution caused by chemical substances added at high concentration as when chemical coagulation of wastewater is used

(19) The gas bubbles produced during electrolysis can carry certain pollutants to the top of the solution where it can be more easily concentrated, collected and removed (e.g., by skimming).

(20) The electrolytic processes in the EC cell are controlled electrically and with no moving parts, thus requiring less maintenance.

(21) The EC technique can be conveniently used in rural areas where electricity is not available since a solar paned attached to the unit may be sufficient to carry out the process.

The sacrificial electrodes are expended by being dissolved into the wastewater stream and eventually need to be replaced. The regularity here depends on the wastewater composition and the volume treated. For nuclear applications, replaceable canisters containing the electrodes would be used. An impermeable oxide film may be formed on the cathode leading to loss of efficiency of the EC unit. However, this does not occur if the unit for the process water is forced into turbulence and this oxide is never allowed to form. Self cleaning by periodic current application, controlled by the computer, will also prevent scaling.

Reasonable levels of conductivity of the wastewater suspension is required. This can be compensated for in low conductivity applications by increasing the electrode area, increasing the residence time (e.g., recycle or additional cells in series), increasing the amperage (e.g., jumpering electrodes to place them in parallel), and/or adding innocuous chemicals to increase conductivity and/or pH (e.g., sodium sulfate or sodium bicarbonate or baking soda).

DRAWINGS

The invention, including its operational steps and the components and systems for carrying out those steps, may be further understood by reference to the detailed description below taken in conjunction with the accompanying drawings in which:

FIG. 4 is an exploded view illustrating details of a modified housing and filtering media for the electromagnetic filtering unit of FIG. 3;

FIG. 5 is an enlarged view of a portion of the ferro-magnetic filtering media identified by the circle 5 in FIG. 4;

FIG. 6 is an exploded view similar to FIG. 4 showing an alternative embodiment of the ferro-magnetic filtering media;

FIG. 7 is an exploded view similar to FIG. 4 showing a farther alternative embodiment of the ferro-magnetic filtering media; and, FIG. 8 is an exploded view similar to FIG. 4 showing another alternative embodiment of the ferro-magnetic filtering media.

DETAILED DESCRIPTION

Figure 1:
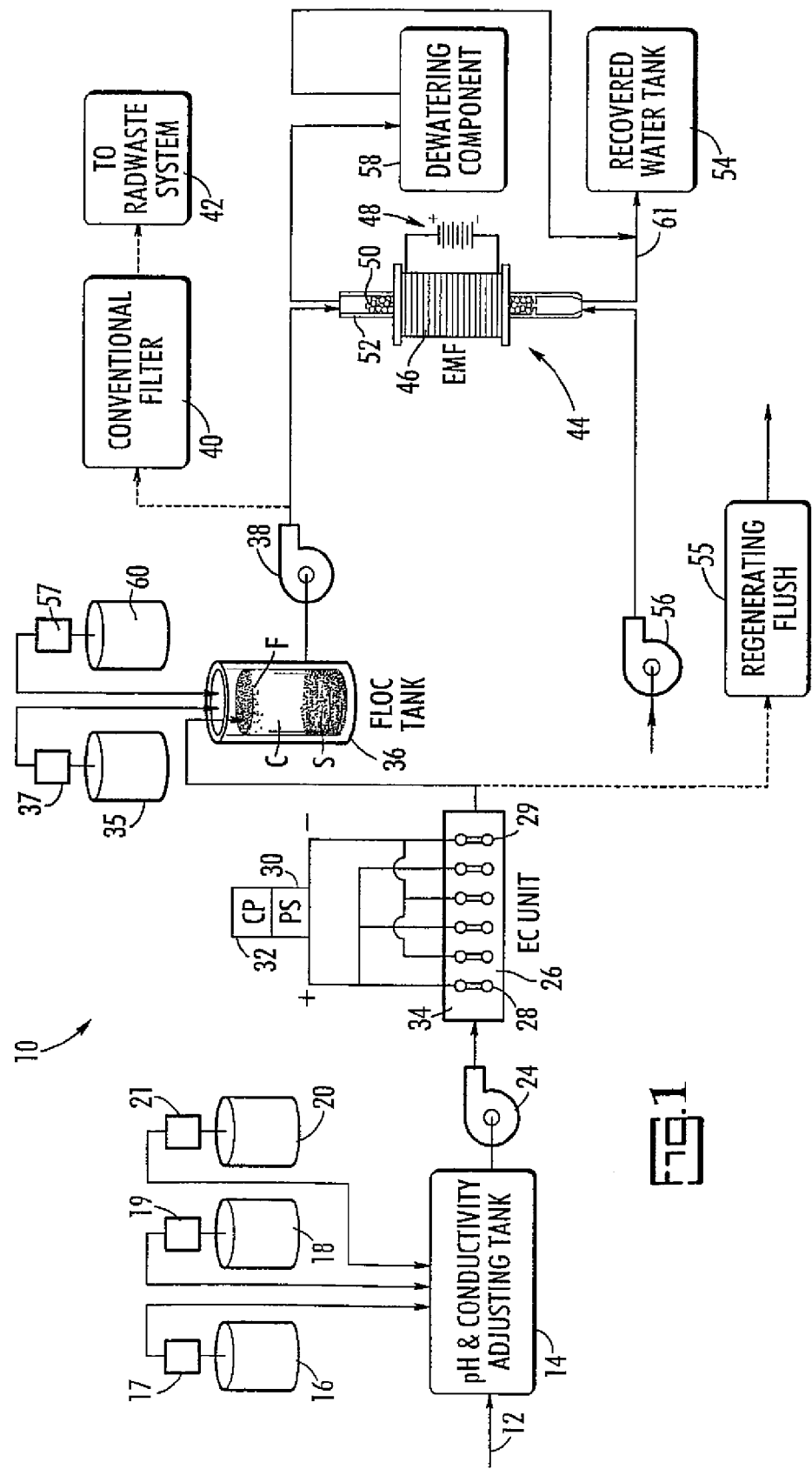
FIG. 1 is a diagrammatic illustration of the system of the invention for carrying out its processing of radioactive waste water.

In the electrocoagalation (EC) unit of the invention, a direct current is applied to a cathode-anode system in order to destabilize any dissolved ionic or electrostatically suspended contaminants. During this electrolytic process, cationic species from the metal of sacrificial anodes dissolve into the water. These positively charged cations neutralize and thereby destabilize negatively charged contaminants and also create metal oxides and hydroxides which precipitate and bring down the neutralized contaminants as part of the precipitate. If aluminum anodes are used, aluminum oxides and hydroxides are formed. If iron anodes are used, iron oxides and hydroxides form. Aluminum anodes are preferred for the present invention because iron anodes become readily coated with iron oxide, which interferes with the electrolytic process.

The formation of the metal oxides and hydroxides, and their subsequent precipitation, are similar to the processes which occur during coagulation or flocculation using alum or other chemical coagulants. The difference is that in electro-coagulation, the cations are produced by electrolytic dissolution of the anode metal instead of by adding a chemical coagulant. In addition, the activation energy provided by the application of an electrical current will promote the formation of oxides, instead of hydroxides which may be in a slimy form that may clog filters, if the electrical energy supplied by the unit exceeds the activation energy for formation of the metal oxide. The metal oxides are more stable than the hydroxides and therefore more resistant to breakdown by acids. The dissolved contaminants are incorporated into the molecular structure of these acid resistant precipitates by ion bridging and/or adsorption. Also, the weak intermolecular force known as van der Waalls' force causes these molecules to be attracted to one another and thereby coagulated into a floe. The precipitated floe is often capable of passing the requirements of the TCLP (the EPA's Toxicity Characteristic Leaking Procedure), which will significantly reduce solid waste disposal costs.

In addition, during the electrolytic process, oxygen gas is produced at the anode by the electrolysis of the water molecules. Simultaneous reactions take place at the cathode producing hydrogen gas from the water molecules. These gases can cause the coagulated floe molecules to float, and can also cause flotation and coagulation of oils, greases, and biological materials, such as the residue produced by the rupturing of bacteria and other microorganisms by electro-osmotic shock. The floating floe can be skimmed off for disposal, or it may be subjected to shaking or other turbulence to degas the floc and cause it to settle with the metal precipitates. The coagulation process preferably increases the size of submicron particles to particles as large as 100 microns, preferably to an average size of at least 20 microns so that the precipitate particles are easily removable by a standard 20 or 25 micron filter.

Another important cathodic reaction involves the reduction of dissolved metal cations to the elemental state so that they plate out as a metal coating on the cathodes. Since at least some of these metals will be radioactive, the cathodes of the invention must be regenerated in place by reversing their polarity so that the process anodes become regenerating cathodes and the process cathodes become regenerating anodes to thereby unplate the metal coating from the process cathodes, and by providing a fluid flow past the regenerating anodes (i.e., the process cathodes) to carry off the unplated metal cations to a conventional radioactive waste disposal system.

Referring now to FIG. 1, there is shown a radioactive water treatment system, generally designated 10, wherein the pH and the conductivity of an influent waste water stream 12 may be adjusted, if needed, in a tank 14. High pH may be adjusted downward by the introduction of an acid solution (such as sulfuric) from a tank 16, or low pH may be adjusted upward by the introduction of a base solution (such as sodium hydroxide or sodium bicarbonate) from a tank 18. To raise the waste water conductivity, an electrolytic solution (such as sodium sulfate or sodium bicarbonate) may be introduced into tank 14 from a tank 20. The conductivity also may be raised by introducing an iron component, such as magnetite into the adjusting tank 14, especially where the precipitates in the effluent water from the EC unit 26 are to be subsequently removed by the EMF unit. Some of the isotopes of concern in the waste water to be treated are transition metal activation products, such as Mn-54, Fe-55, Fe-59, Co-58, Co-60 and Zn-65, and their relatively short-lived decay progeny.

The acid solution may be transferred to the adjusting tank 14 by a metering pump 17, the base solution by a metering pump 19, and the electrolytic solution by a metering pump 21. When the influent waste water is within the desired pH range from 6 to 8, preferably from 6.5 to 7.5, more preferably about 7.0, and the conductivity is in the range of 2 to 1000 μmhos, preferably at least 5.0 μmhos, more preferably at least 20 μmhos, most preferably in the range of 200 to 800 μmhos (tap water being about 200 μmhos), the adjusted waste water is transferred by a pump 24 to an electro-coagulation (EC) unit 26 having a plurality of sacrificial metal anodes 28 connected in parallel to the positive terminal of a power source 30, and a plurality of cathodes 29 connected in parallel to the negative terminal of the power source 30.

The waste water fed to the EC unit 26 functions as an electrolyte 34 for carrying a current between the anodes 28 and the cathodes 29, the amount of this current depending on the conductivity of the waste water and the voltage across the terminals of the power source, which is regulated by a control panel 32. The amount of current is preferably at least 3 amps, more preferably in the range of 4 to 6 amps. As explained elsewhere, electrolytic reactions and dissolution of the metal of the sacrificial anodes 28 cause coagulation of the dissolved, colloidal and suspended contaminants in the waste water to produce precipitates in the form of floc or sediment. From the EC unit 26, the thus treated waste water flows to a floc and sediment tank 36, in which a portion of the precipitants may float as a floe F and a portion of the precipitants may settle out as a sediment S, an intermediate volume between the two being a clarified body of water C.

At this point, the floating flow F may be skimmed off, the clarified water C decanted from the sediment S and sent on for further processing if needed, and the sediment S may be transferred to a dewatering container such as a high integrity container (HIC) with sheet filters and thereafter disposed of in conventional fashion. However, in many cases, further processing of the contents of tank 36 may be preferable to provide an effluent water containing even less contaminants that are present in the clarified water C. For further processing, either or both the sediment S and the floe F may be remixed with the clarified water C and the mixture transferred by a pump 38 to a conventional separation device for separating the precipitates from the waste water, such as a high gradient magnetic filtration unit, an ultrafiltration unit, a microfiltration unit, a dewaterable HIC with sheet filters, or preferably a backflushable filter (BFF), all as represented by the box 40 designated as a conventional filter in FIG. 1. The filtered precipitates separated from the waste water by conventional filter 40 are then transferred to a conventional radwaste system 42 for disposal. To further enlarge the size of the floc and sediment precipitates and any still suspended precipitates in tank 36, a flocculation polymer, such as BETZ-1138, may be added to the contents of tank 36 from a supply tank 35 via a metering pump 37.

Preferably the mixture from tank 36 is transferred by pump 38 to an electromagnetic filter (EMF) unit 44 made and operated in accordance with the invention as described below. When the magnetic field of the EMF is activated by applying to its electrical coils 46 a direct current from a power source 48, the portion of a ferro-magnetic filtering media bed 50 surrounded by the coil 46 is magnetized and thereby rendered capable of magnetically removing from the wastewater any electro-coagulated precipitates containing a ferro-magnetic component, such as iron containing precipitates where the waste water influent 12 comes from a boiling water reactor (BWR). The ferro-magnetic filtering media bed 50 is made up of a plurality of small ferro-magnetic pieces, preferably small stainless steel balls of a soft, or temporary, magnetic material (e.g. 430 S.S.) that may have a smooth or multi-faceted surface (the former being preferred). The balls are stacked in a tubular housing 52 that is made of a non-magnetizable material and passes through the center of electrical coil 46. The precipitate containing waste water preferably passes downward through the housing 52, the media bed 50 and the coil 46. The effluent from the EMF unit 44 may thereafter be sent to a recovered water tank 54 for discharge or recycle.

While electric current from the power source 48 is passing through coil 46, the filtering media bed 50 is magnetized and therefore attracts and accumulates the ferro-magnetic precipitates in the waste water influent from floc tank 36. When the filtering efficiency of the EMF unit deteriorates to an unacceptable level, electrical current to coil 46 is turned off and the filtering media 50 is backflushed with a flow of uncontaminated water from a pump 56 to remove the now demagnetized precipitates from the filtering media bed 50 and carry them into a dewatering component 58, which is preferably a HIC with sheet filters or a BFF, but also may be another type of conventional filter. The clarified water recovered from dewatering container 58 may then be sent to the recovered water tank 54 for discharge or recycle.

If the effluent from the EC unit as collected in tank 36 contains non-ferro-magnetic species such as cesium (Cs), this species may also be removed by the EMF unit by first adding to the contents of tank 36 a magnetic complexing agent from a magnetic seeding tank 60 via a metering pump 57. The complexing agent has a ferro-magnetic component. The complexing agent therefore forms a magnetic complex with the non-ferromagnetic species so that the EMF unit may be used for separating the resulting ferro-magnetic complex from the waste water. Where the non-ferromagnetic species is Cs, a preferred complexing agent is as cobalt hexaferricyanate.

As previously indicated, the cathodic reaction involves the reduction of dissolved metal cations to the elemental state so that they plate out as a metal coating on the cathodes 29. Since at least some of these metals will be radioactive, the cathodes 29 must be periodically regenerated in place by reversing their polarity so that the process anodes 28 become regenerating cathodes and the process cathodes 29 become regenerating anodes to reverse the direction of the current flow and thereby unplate the metal coating from the process cathodes. Pump 24 may be used to provide a fluid flow past the regenerating anodes (i.e., the process cathodes) that serves as a regenerating flush 55 to carry off the unplated metal cations to a conventional radioactive waste disposal system, such as radwaste system 42.

Figure 2:
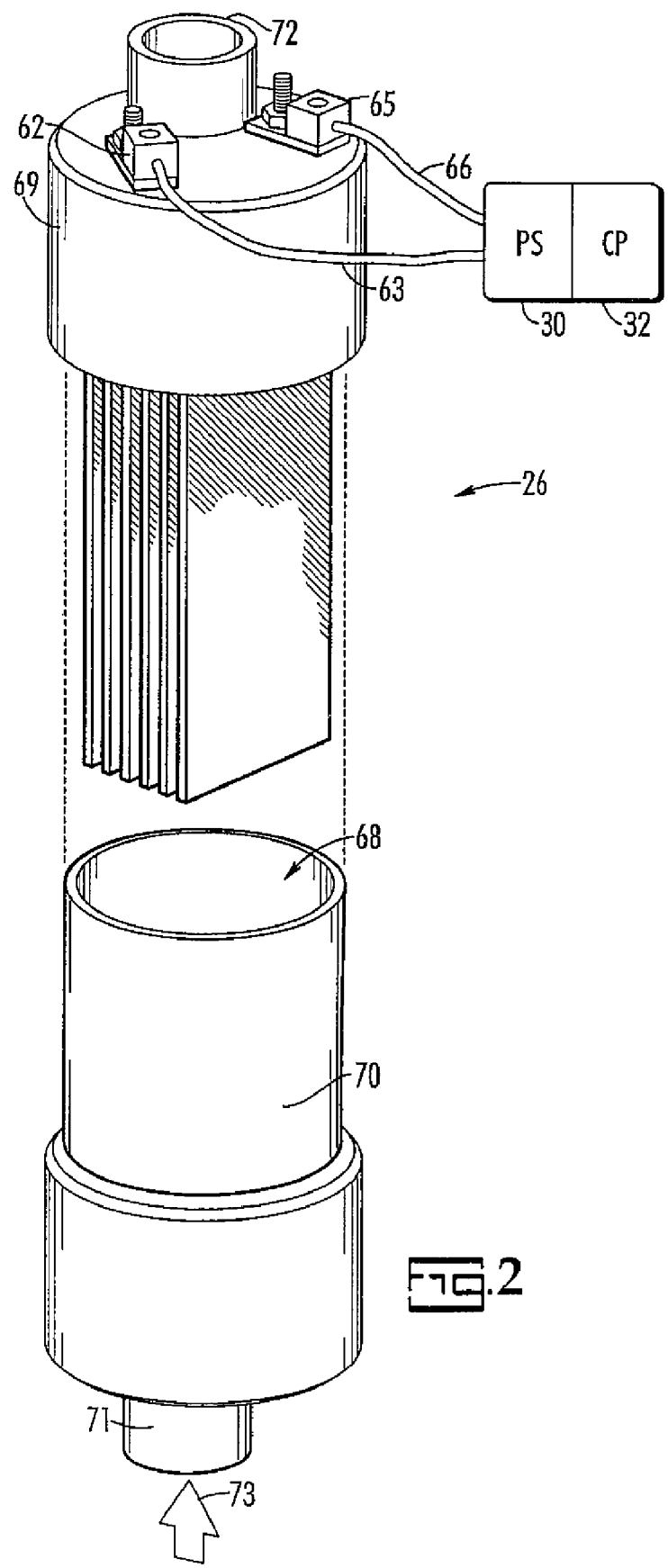
FIG. 2 illustrates the electro-coagulation unit of the invention.

The details of a preferred embodiment of the EC unit is shown in FIG. 2, wherein the sacrificial anodes 28 are connected in parallel to the positive terminal of the power source 30 via a positive terminal 62 and a connecting wire 63. The cathodes 29, which alternate with the sacrificial anodes, are connected in parallel to the negative terminal of the power source 30 via a negative terminal 65 and a connecting wire 66. The anodes 28 and the cathodes 29 are mounted on a header or cap 69 so as to be suspended within an electrolyte chamber 68 of a housing 70, which has fluid inlet 71 and a fluid outlet 72. The fluid flow through the electrolyte chamber 68 is preferably upward in the direction of arrow 73, and the flow rate may be in the range of 1 liter per minute (lpm) to 200 gallons per minute (gpm), preferably at least 5 gpm per cell. The housing for a typical cell would be about four to six inches in diameter and about three to four feet long, and would contain about three to four anodes and about three to four cathodes. A typical production unit would comprise about 6 to 12 cells in parallel so that the overall flowrate would be preferably about 30 to 60 gpm for a PWR, BWR, fuel pool, or storage basin. Although an upflow in the direction of the arrow 73 is preferred, the waste water being treated may flow through the housing chamber 68 in either direction. Upflow through the EC unit 26 is preferred both for treatment of the waste water and for cleaning in place the electrodes 28 and 29 because the electrodes are preferably mounted and suspended down from the cap 69 such that there is less interference to fluid flow if that flow enters between the plates at their distal ends.

The EC unit 26 alone will bring down as a precipitate at least 99 percent of the metal contaminants (whether present as ions, colloids and suspended particles) in the waste water influent stream of 12, so that subsequent filtration, preferably by an EMF unit of the type described, will remove from the radioactive waste water substantially all of the contaminants. Testing of an EC unit similar to that shown in FIG. 2, where measurements were made of the metals content of the influent and of the clarified water (supernate) in a settling container receiving the EC unit effluent, has demonstrated the following removal efficiencies: 99.0% to 99.9% for copper, 99.8% for iron, 99.5% for nickel, and 98.7% to 99.9% for zinc. The demonstrated removal efficiency for total suspended solids was 97.9%.

Figure 3:
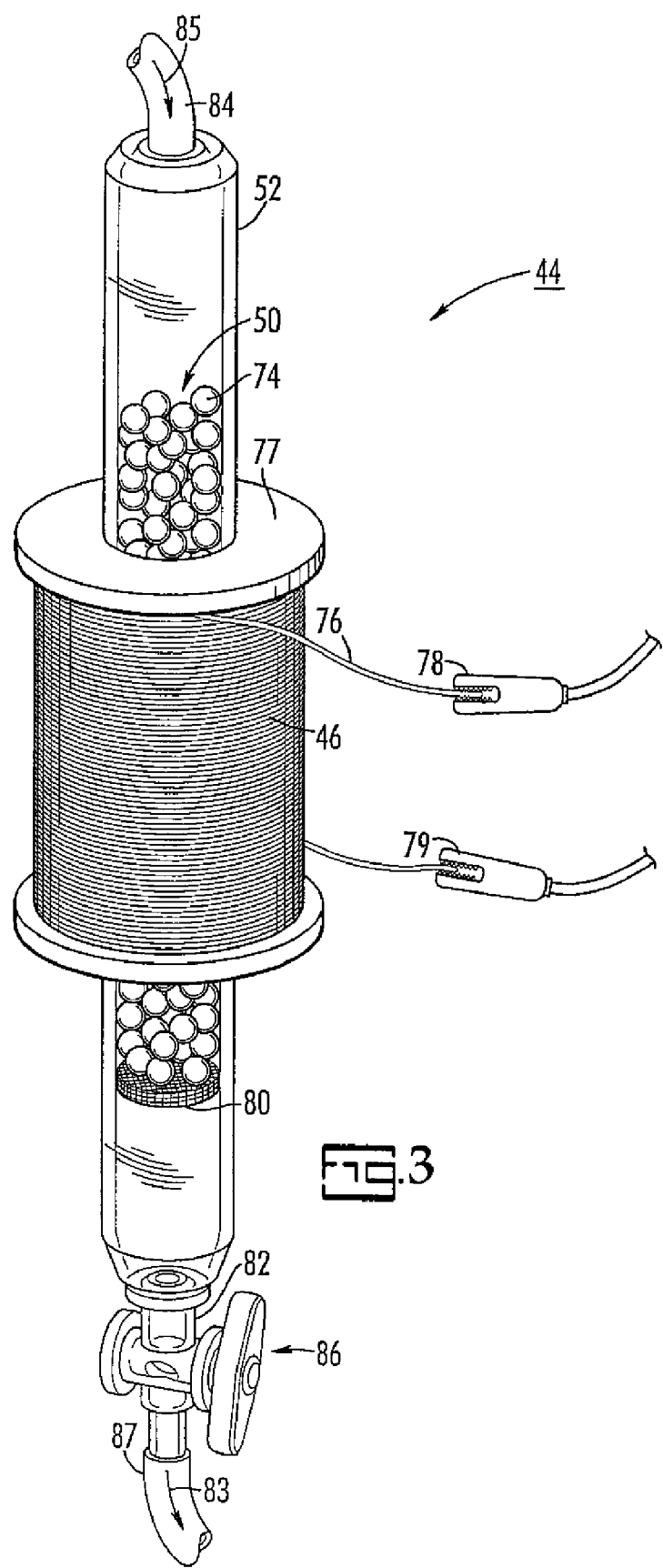
FIG. 3 illustrates the electromagnetic filtering unit of the invention.

A preferred embodiment of the EMF unit is shown in FIG. 3, which shows more clearly than FIG. 1 that the filtering media bed 50 comprises a plurality of small pieces, preferably stainless steel ball bearings 74, and that the longitudinal centerline of the media housing 52 is preferably aligned with the central axis of the electrical coil 46 surrounding the housing 52. Ball bearings with smooth round surfaces are preferable for use in the packed bed 50 because such a packed bed has a large void volume, which allows a high loading of ferro-magnetic precipitates. The coil 52 is made up of a continuous electrical conductor 76 that is coiled around a spool 77. The respective ends of the conductor 76 are connected to the direct current power source 48 via electrical connectors 78 and 79 and their corresponding connector wires. The EMF unit includes a support screen 80 of a mesh size large enough to provide free liquid flow but small enough to prevent passage of the filter media balls 74. Thus, screen 80 supports the filter media above the outlet 82 of the housing 52. The unit 44 is connected to the outlet of pump 38 by a conduit 84 and to the recovered water tank 54 by a conduit 87, which may also include a valve 86 for controlling the rate of fluid flow through the filtering media 50. The direction of fluid flow through the filtering media bed 50 is preferably downward as illustrated by the arrows 83 and 85 so as to facilitate a subsequent upward backwashing flow that is more effective than a downward flow for removing accumulated precipitates because the heavier crud accumulates at and near where flow enters the bed, and support screen 80 would interfere with using a downward flow to dislodge this crud. However, the EMF unit is also effective for the removal of ferro-magnetic precipitates irrespective of the direction of flow of the waste water being treated or of the backflush water. The rate of fluid flow through the EMF housing 52 may be in the range of 1 lpm to 200 gpm, depending on the overall flow rate through the production EC unit, such that the production EMF unit flow would preferably also be in the range of 30 to 60 gpm.

In FIG. 4, there is shown a modified EMF housing 52' having an end cap 90 at each end for retaining the filtering media within the housing and for connecting the housing to the influent and effluent conduits. Each housing end cap contains a wall 91 for supporting the filtering media and through which passes a flow tube 92 containing a screening member 93 for preventing passage of the individual pieces of the filtering media. Also shown is a modified filtering media comprised of multifaceted 430 stainless steel balls 74', the facets of which are shown more clearly in FIG. 5.

In FIG. 6, there is shown an alternative modification of the EMF unit wherein the filtering media is a 430 stainless steel screen 94 with a 10 micron mesh size, the punched out or woven screen apertures 95 of which are shown more clearly in FIG. 7. In FIG. 8, there is shown a further alternative embodiment of the EMF unit wherein the filtering media comprises one or more tubular sheets 97 of 430 stainless steel.

The preferred parameters for electrolytic coagulation of ions and colloids and other solids suspended in radioactive waste water are: adjust waste water pH into range of 5.5 to 8.0, preferably 7.0-8.0, by adding if needed sodium hydroxide or bicarbonate of soda, adjust resistivity to 5 μmhos per centimeter or greater, preferably 20 to 30 μmhos per centimeter (micro-siemens per centimeter, i.e., μmhos are the reciprocal of μohms and may also be referred to as micro-siemens) by adding if need sodium sulfate or sodium bicarbonate, and then apply 4 to 6, preferably 5, amps of direct current (DC) at 23-24 volts. The coagulated floc produced by these parameters can be removed by a 20 to 25 micron filter. Waste water with resistivity of less than 5 μmhos may be adjusted into the desired range by the addition of sodium sulfate or bicarbonate of soda.

The effectiveness of electro-coagulation (EC) may be increased by providing greater electrode contact time by lowering the flow rate or recycling the flow, by increasing the electrode area immersed in the electrolyte, by increasing the current density between the anodes and cathodes, such as by jumpering electrodes of the same type where they are connected in series between the positive and negative terminals (thereby connecting them in parallel), and by raising the conductivity by adding sodium sulfate or bicarbonate of soda.

Because radioactive metals will plate out on the cathode of the electro-coagulation apparatus, it is preferable that these electrodes be cleaned of the deposited metals while remaining in place, instead of being removed for cleaning in a decontamination facility. Such cleaning in place is preferably accomplished by a temporary current reversal during which the EC anode becomes a cathode and the EC cathode becomes an anode to accomplish electro-cleaning. This current reversal causes the plated metals to be redissolved into a waste liquor which is then back flushed to a conventional radioactive disposal system.

The preferred parameters for the magnetic filter is to apply 10 amps of direct current at 36 volts to the conductor coils surrounding the core of stainless steel ball bearings 74, each preferably having a diameter of about 0.2-0.5 centimeters (cm), more preferably 7/32 inch diameter balls. The stainless steel balls used should serve as a soft magnetic core that does not stay magnetized in the absence of direct current through the surrounding coils. If a hard magnetic core is used, an alternating current must subsequently be applied to the coil to "demagnetize" the hard metal core that would otherwise retain its magnetism.

Since the floc in BWR waste water contains iron, it is magnetic and can be separated from the waste water by the electromagnetic filter. If the amount of ferromagnetic material in the waste water is low, the effectiveness of electromagnetic filtering (EMF) may be enhanced by the addition of magnetite as a seeding agent to the wastewater before it is subjected to electro-coagulation. If the clarified water leaving the combined EC-EMF system has a conductivity that is too high for disposal, reuse or recycle, the conductivity may be lowered by passing the clarified water through an ion exchange system.

The following is an example of the operation of the system of FIG. 1 for the treatment of radioactive waste water containing contaminants in the form of a solution or slurry comprising ions, colloidal particles and suspended solids. The slurry is fed to the adjusting tank 14, wherein its pH is adjusted from 5.5 to 7 by the addition of sodium hydroxide (or sodium bicarbonate, which adjusts both pH and conductivity) and its conductivity is adjusted from about 2 μmhos to about 100 μmhos by the addition of a saturated sodium sulfate solution or a sodium bicarbonate solution. The lower conductivity would have resulted in negligible current flow between the EC electrodes, whereas the higher conductivity will provide a current of about 4-5 amps. The adjusted influent from the adjusting tank 14 is fed to the EC unit 26 at a flow rate, and the power supply 30 is operated at a voltage, sufficient to apply a current of 1-amp-minute through the waste water as it flows through the EC unit on its way to the floc tank 36. In the floc tank 36, sufficient Betz-1138 could be added to provide about 4-10 parts per million (ppm) of this flocculation polymer, which serves to make the sediment S and the floc F in tank 36 significantly larger. However, the EC unit alone is more readily dewaterable due to having less bound water, higher sheer strength, etc.

The thus treated waste water is then conveyed by pump 38 through the EMF unit 44 where this waste water passes through a packed bed of ball bearings made of 430 stainless steel and having smooth surfaces (as most preferred). A current of 7.5 amps is applied to the coils during passage of the waste water through the electromagnetic field generated thereby. The flow rate of this water through the housing 52, and the axial length of the coil 46, are such that the residence time of the waste water within the magnetic field is about 2.5 seconds. The effectiveness of this treatment is evident by the visual clarity (clear and colorless) of the EMF effluent delivered to the recovered water tank 54, as compared with the densely clouded (opaque) suspension of red/brown precipitates of the stirred contents of floe tank 36 as it is fed to the pump 38. This treated water also has no detectable non-volatile radioactivity (there could still be some volatile tritium gas).

Thereafter, the EMF unit is cleaned by turning off the current and providing a liquid flow reversal through the packed ball core by activating pump 56 to flush away the accumulated floc and convey this floc to a dewatering container 58, such as a high integrity container (HIC), or some other conventional disposal system for handling radioactive sludges. The deposited settlement from this cleaning liquid will usually meet the EPA's TCLP requirements for disposal, and therefore may usually be sealed in the HIC and shipped to a low level waste site for disposal.

It will be apparent to one of ordinary skill in the art of waste treatment that many other modifications and substitutions may be made to the preferred embodiments described above without departing from the spirit and scope of the present invention as defined by the claims set forth below.

What is claimed is:

1. A method comprising:
    applying an electric current to radioactive waste water to precipitate contaminants in the waste water and produce a first treated waste water;
    adding a magnetic complexing agent to the first treated waste water that forms a magnetic complex with one or more non-magnetic contaminants; and separating magnetic contaminants from the first treated waste water with an electro-magnetic filter unit to produce a second treated waste water.

2. The method of claim 1 wherein the magnetic complexing agent includes cobalt hexaferricyanate.

3. The method of claim 1 comprising demagnetizing the electro-magnetic filter unit and backflushing the electro-magnetic filter unit to remove accumulated contaminants.

4. The method of claim 1 comprising separating at least some of the precipitated contaminants from the first treated waste water before using the electro-magnetic filter unit to separate the magnetic contaminants.

5. The method of claim 1 comprising adjusting the pH of the waste water to be 6 to 8 before applying the electric current.

6. The method of claim 1 comprising adjusting the conductivity of the waste water to be 2 to 1000 μmhos before applying the electric current.

7. The method of claim 1 wherein the electro-magnetic filter unit includes a filter medium surrounded by an electro-magnetic coil, and wherein the electro-magnetic coil selectively magnetizes and demagnetizes the filter medium.

8. The method of claim 1 wherein the contaminants precipitated in the first treated waste water comprise radionuclides.

9. The method of claim 1 wherein the electro-magnetic filter unit includes a magnetic filter medium, the method comprising regenerating the magnetic filter medium to remove accumulated contaminants.

10. The method of claim 1 wherein the electric current is applied to the waste water with a sacrificial anode that is made of aluminum.

11. The method of claim 1 wherein the electric current is applied to the waste water with a sacrificial anode that is made of iron.

12. A method comprising:
electrically coagulating contaminants in the radioactive waste water;
adding a magnetic complexing agent to the first treated waste water that forms a magnetic complex with one or more non-magnetic contaminants;
separating magnetic contaminants from the waste water with an electro-magnetic filter unit;
demagnetizing the electro-magnetic filter unit; and
backflushing the electro-magnetic filter unit to remove the magnetic contaminants.

13. The method of claim 12 wherein the magnetic complexing agent includes cobalt hexaferricyanate.

14. The method of claim 12 comprising separating at least some of the precipitated contaminants from the first treated waste water before using the electro-magnetic filter unit to separate the magnetic contaminants.

15. The method of claim 12 wherein the electro-magnetic filter unit includes a filter medium surrounded by an electro-magnetic coil, and wherein the electro-magnetic coil selectively magnetizes and demagnetizes the filter medium.

16. The method of claim 12 wherein the contaminants precipitated in the first treated waste water comprise radionuclides.

17. The method of claim 12 wherein the electric current is applied to the waste water with a sacrificial anode that is made of aluminum.

18. The method of claim 12 wherein the electric current is applied to the waste water with a sacrificial anode that is made of iron.

19. A method comprising:
applying an electric current to radioactive waste water to precipitate contaminants in the waste water and produce a first treated waste water;
adding a magnetic complexing agent to the first treated waste water that forms a magnetic complex with one or more non-magnetic contaminants; and
separating magnetic contaminants from the first treated waste water with an electro-magnetic filter unit to produce a second treated waste water;
wherein the one or more non-magnetic contaminants include cesium and the magnetic complexing agent includes cobalt hexaferricyanate.

20. A method comprising:
electrically coagulating contaminants in the radioactive waste water;
adding a magnetic complexing agent to the first treated waste water that forms a magnetic complex with one or more non-magnetic contaminants;
separating magnetic contaminants from the waste water with an electro-magnetic filter unit;
demagnetizing the electro-magnetic filter unit; and
backflushing the electro-magnetic filter unit to remove the magnetic contaminants;
wherein the one or more non-magnetic contaminants include cesium and the magnetic complexing agent includes cobalt hexaferricyanate.

* * * * *